(12) United States Patent
Schievelbusch et al.

(10) Patent No.: US 9,868,514 B2
(45) Date of Patent: Jan. 16, 2018

(54) FLAP SYSTEM FOR AN AIRCRAFT HIGH LIFT SYSTEM OR AN ENGINE ACTUATION AND METHOD FOR MONITORING A FLAP SYSTEM

(71) Applicant: Liebherr-Aerospace Lindenberg GmbH, Lindenberg (DE)

(72) Inventors: Bernd Schievelbusch, Lindenberg (DE); Manfred Fischer, Markdorf (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 305 days.

(21) Appl. No.: 14/455,071

(22) Filed: Aug. 8, 2014

(65) Prior Publication Data
US 2015/0076283 A1 Mar. 19, 2015

(30) Foreign Application Priority Data
Aug. 9, 2013 (DE) .................. 10 2013 013 340

(51) Int. Cl.
*B64C 13/28* (2006.01)
*B64C 9/18* (2006.01)
(Continued)

(52) U.S. Cl.
CPC ............... *B64C 13/28* (2013.01); *B64C 9/18* (2013.01); *B64D 45/00* (2013.01); *F02K 1/54* (2013.01);
(Continued)

(58) Field of Classification Search
CPC ........... B64C 13/28; B64C 9/18; B64D 45/00; B64D 2045/001; B64D 2045/0085; F02K 1/54
See application file for complete search history.

(56) References Cited

U.S. PATENT DOCUMENTS

| | | | | |
|---|---|---|---|---|
| 5,719,566 A | * | 2/1998 | Readman ........... | B64D 45/0005 244/178 |
| 6,622,972 B2 | * | 9/2003 | Urnes, Sr. ............ | G05D 1/0055 244/194 |

(Continued)

FOREIGN PATENT DOCUMENTS

| | | |
|---|---|---|
| DE | 10 2010 044 687 A1 | 3/2012 |
| EP | 2 039 605 A2 | 3/2009 |
| EP | 2 695 810 A1 | 2/2014 |

*Primary Examiner* — Valentina Xavier
(74) *Attorney, Agent, or Firm* — Dilworth & Barrese, LLP

(57) ABSTRACT

The invention relates to a flap system for an aircraft high lift system or an engine actuation with a rotary shaft system, one or more drive stations as well as elements for transmitting the drive energy from the rotary shaft system to the one or more drive stations, wherein at least one drive station includes at least two independent load paths with at least one rotational transmission each for actuating the flap kinematics, and per load path at least one mechanically coupling-free synchronization unit is provided for compensating regular load fluctuations between the load paths. The invention furthermore relates to a method for monitoring a flap system with at least two redundant load paths which each comprise at least one rotational transmission, wherein it is cyclically checked whether the difference of the output-side torques of the at least two load paths exceeds a defined threshold value and/or lies within a defined limit range.

9 Claims, 3 Drawing Sheets

(51) Int. Cl.
  *B64D 45/00* (2006.01)
  *F02K 1/54* (2006.01)
(52) U.S. Cl.
  CPC .................. *B64D 2045/001* (2013.01); *B64D 2045/0085* (2013.01)

(56) References Cited

U.S. PATENT DOCUMENTS

| | | | | |
|---|---|---|---|---|
| 8,033,500 | B1* | 10/2011 | Charafeddine | B64C 13/28 244/75.1 |
| 8,868,261 | B2* | 10/2014 | Recksiek | 244/75.1 |
| 2013/0181089 | A1* | 7/2013 | Recksiek | B64C 9/16 244/99.3 |
| 2016/0001894 | A1* | 1/2016 | Jones | B64D 45/0005 701/3 |

* cited by examiner

FLAP SYSTEM FOR AN AIRCRAFT HIGH LIFT SYSTEM OR AN ENGINE ACTUATION AND METHOD FOR MONITORING A FLAP SYSTEM

BACKGROUND OF THE INVENTION

The invention relates to a flap system for an aircraft high lift system or an engine actuation with a rotary shaft system, one or more drive stations as well as elements for transmitting the drive energy from the rotary shaft system to the one or more drive stations. Furthermore, the invention relates to a method for monitoring such flap system.

Aircraft high lift systems adapt the wing profile to the respective flight situation by means of a suitable flap mechanism. What is known are aircraft high lift systems with a central drive unit in the form of a rotary shaft system which is connected with one or more drive stations via branch transmissions. These drive stations each comprise an appropriate drive which converts the rotational energy provided by the rotary shaft system into the appropriate flap kinematics.

Up to now, two individual drives are used per flap. Flaps arranged one beside the other are connected with each other via mechanical coupling points, so-called interconnection struts, in order to prevent skewing of the flap during extension and retraction in the case of the failure of a drive. In the case of the failure of a drive station, the load path extends to the adjacent flap via the interconnection strut.

This mechanical connection between the flaps, however, prevents the implementation of an extended flap functionality, in particular the possibility of an adaptive camber of the wing profile by means of differential flap positioning over the wingspan. For realizing such extension function, the previously provided mechanical coupling path between the flaps must be omitted. By omitting the coupling, however, the redundancy is lost and a novel safety concept is required for protection against structural faults.

An identical or similar flap system is used in the engine actuation of an aircraft engine. By means of the flap kinematics the function of a thrust reversal can be realized.

SUMMARY OF THE INVENTION

The object therefore consists in finding a novel technical solution for the mechanical arrangement of the elements of a flap system for an aircraft high lift system or an engine actuation, which provides for the realization of the described extended functional requirements and nevertheless ensures a sufficient safety-related protection of the construction.

This object is solved by a flap system according to the features herein. This system comprises a rotary shaft system, one or more drive stations as well as elements for transmitting the drive energy from the rotary shaft system to the one or more drive stations. According to the invention, at least one drive station includes at least two independent load paths with at least one rotational transmission each for actuating the flap kinematics. By means of the rotational transmission, the drive-side torque of the rotary shaft system or its rotational speed is converted into the desired setpoint speed or setpoint torque, in order to produce the desired flap movement by means of a suitable flap mechanism.

In the arrangement according to the invention it is decisive that between the redundant load paths of the drive station no mechanical coupling exists, i.e. the two load paths operate in parallel completely independent of each other. Both load paths are active during the regular operation, i.e. the desired flap movement is effected by both load paths. Particularly advantageously, the necessary load moment for the flap actuation is distributed on both load paths in equal or almost equal proportions. As compared to known linear drives, rotational drives require distinctly less maintenance, which is why the incurred operating costs of the aircraft systems can be minimized by the use of rotational drives according to the invention.

In previous systems with interconnection struts high fault loads are obtained in the case of an interruption of a simple load path, which due to the mechanical coupling proportionately have an effect on the intact station. These fault loads must be taken into account in the design of the flap bodies, the flap guiding mechanisms and the actuators. Since the load distribution at the drive stations of a landing flap can be distinctly unsymmetrical, e.g. in a ratio of 1:3, in particular the elements of the stations loaded less in normal operation must be oversized by a multiple. These problems can be avoided completely by the mechanical decoupling between the flaps according to the invention, because the fault "disconnect of a drive station" is excluded by the redundancy in the drive station.

According to the invention, at least one mechanically coupling-free synchronization unit furthermore is provided per load path for compensating regular load fluctuations between the load paths. In fault-free operation, the station load automatically is distributed on the provided load paths in equal proportions. The prevailing load equilibrium can be impaired, however, due to different drag torques, clearances, efficiencies and adjustment errors (rigging) of the load paths. In the extreme case, the imbalance resulting therefrom can be more the +/−25% of the maximum value of the station load. In particular for monitoring purposes of the flap system according to the invention it is necessary to achieve a compensation of these load fluctuations between the load paths. In concrete terms, an independent synchronization of the transmitted load components of the individual load paths can be effected, wherein this synchronization remains largely free of repercussions within the respective load path. No power transfer occurs between the two load paths. Upon occurrence of an interruption of one of the load paths, the remaining load path can take over the entire load of the drive.

The flap system according to the invention is suitable for use in an aircraft high lift system for actuating the flaps arranged at the wings. The system however also is usable without limitation in certain systems for engine actuation of an aircraft by means of flaps. In particular, this includes the actuation of the thrust reversal by means of a flap arrangement. For the sake of simplicity, advantageous aspects will be described below with respect to an aircraft high lift system. However, the aspects equally apply for use in the engine actuation and in particular do not limit the subject-matter to the use in aircraft high lift systems.

In a preferred aspect of the invention, at least one synchronization unit substantially consists of a torsion spring whose spring rate is designed such that in fault-free operation the asymmetry of the load distribution does not exceed a range of +/−25% of the maximum value of the operating load. The construction preferably can be a torsion bar or a ball ramp mechanism biased with springs.

In a preferred conceptional design of the invention, the aircraft high lift system comprises a flap mechanism with lever and push rod.

The lever mechanism transforms the rotational movement of the driven shaft of the rotational transmission into a translational movement for the actuating movement of the landing flap. The push rod transmits the actuating energy to the landing flap or its guide mechanism. The concept according to the invention can, however, also be employed for other comparable guide mechanisms, including for example rack & pinion, track & rear link, curved track, 4-bar linkage, 6-bar linkage, etc.

Monitoring the proper function of the aircraft high lift system according to the invention will be effected in a sensor-based manner. For this purpose, at least one load sensor expediently is arranged on the output side of each rotational transmission. The output-side torque of the individual load paths thereby can be monitored and be compared with each other.

Furthermore, it is expedient to provide at least one overload fuse per rotational transmission on the drive side. In the fault case of jamming in one of the load paths, the same is protected against overload by a mechanical overload fuse present at the input of the station. The jammed load path possibly is interrupted by the overload fuse. In this case, the remaining intact path takes over the total load.

Expediently, the state of the mechanical overload fuse is monitored and detected by one or more state sensors. At least one state sensor can be designed in the form of a proximity switch. Instead of the mechanical overload fuse appropriate load sensors also can be employed, which are arranged on the drive side of the rotational transmissions and by means of an electronic evaluation unit detect the state of the drive train with regard to an overload due to jamming.

Ideally, there is provided an electronic control unit which in dependence on the sensor values monitors the proper function of the aircraft high lift system and in a case of fault generates a corresponding fault message. This fault message not only can indicate the case of fault, but at the same time can identify and/or localize the existing case of fault to a certain extent.

It is conceivable that the control unit includes means for calculating a difference value between the load moments measured on the output side of the respective rotational transmissions.

The construction of the aircraft high lift system according to the invention is usable for a large part of known flap guiding mechanisms. For example, the aircraft high lift system can be constructed according to the model of a Fowler flap system, which preferably allows a differential flap positioning in terms of wingspan.

In principle, the idea of the invention also can be applied to other aircraft high lift systems, for example to a simple hinge or dropped hinge system.

Beside the flap system according to the invention, the invention relates to a method for monitoring a flap system for an aircraft high lift system or an engine actuation, in particular a thrust reversal. It is essential for the method that the flap system includes at least two redundant load paths per flap, which each comprise at least one rotational transmission. Ideally, the method serves for monitoring a flap system according to the present invention or an advantageous configuration of the flap system according to the invention.

The monitoring method according to the invention is suitable for monitoring an aircraft high lift system for actuating the flaps arranged at the wings. The system however also is usable without limitation for monitoring an engine actuation of an aircraft by means of flaps, in particular the thrust reversal. For the sake of simplicity, advantageous aspects of the method will be described below with respect to an aircraft high lift system. However, the aspects equally apply for use in the engine actuation and in particular should not limit the subject-matter to the use in aircraft high lift systems.

In the monitoring method it now is cyclically checked whether the difference of the output-side torques of the at least two load paths, i.e. of the torques at the output shaft of the used rotational transmissions, exceeds a defined threshold value and/or lies within a defined limit range.

Since in the ideal case the total load for flap actuation in proportion is equally distributed on both load paths, an existing fault case can be inferred with a certain deviation of the individual load moments.

Ideally, regular load fluctuations in the individual load paths are compensated by integrated synchronization units per load path, such as for example one or more torsion springs or spring-loaded ball ramp mechanisms, so that a regular load fluctuation does not directly lead to the detection of a case of fault. Thus, different clearances, frictions, efficiencies and adjustment errors within the separate load paths can cause these regular deviations of the measured load values from the actual air loads. This kind of deviation however should not influence the correct evaluation of the signals and the correct fault indication. Therefore, it is particularly advantageous when the defined threshold values or tolerance ranges consider the influence of this effect, in order to ensure a robust fault monitoring. For example, it is recommendable to introduce and consider an offset value when calculating the difference of the load moments.

It is conceivable that the flap system includes at least one overload fuse per load path, which in a case of fault interrupts the respective load path as soon as the existing torque exceeds a certain limit value. In a particularly preferred aspect of the method the drive-side state of the load path, i.e. in particular the state of the overload fuse, now is queried continuously. On the basis of the drive-side and output-side check of the load paths, the method creates a fault image, which not only provides for the easy detection of a fault, but at the same time provides for a first identification and/or localization of the fault that has occurred. Preferably, the fault identified is represented by a binary fault code. The fault image or the binary fault code then can be forwarded to a next higher control hierarchy for the further control logic.

By means of the monitoring system according to the invention an interruption within one of the load paths thus can be detected, i.e. a jamming in one of the load paths or a jamming in the flap mechanism can reliably be detected and diagnosed. The sensor-based monitor concept thus fulfills the demand for a detection and display system for all conceivable cases of fault. It hence is ensured that upon occurrence of a fault the same is detected within a flight cycle. The probability for the occurrence of a dormant fault largely is reduced. The flight cycle defines the time from an event of the present flight up to the repeated same event during the next flight. From the combination of the available sensor signals the kind of fault and the fault location can be determined unambiguously.

This now leads to the fact that during the lifetime of an aircraft no special maintenance measures are required at the system, since both the fault detection and the fault identification are effected automatically by the method according to the invention and no manual diagnosis is required. Merely a manual repair becomes necessary.

The presented monitoring method according to the invention preferably is carried out cyclically during the flight operation. After the first activation, i.e. yet before starting the flight operation, the monitoring method can carry out a one-time system check. It is expedient when the instantaneous values of the respective load sensors are checked against a corresponding threshold value. Checking of the state sensors of the overload fuses likewise can be effected. When all initial checking steps are free from faults, the flight operation is cleared and the corresponding status message is generated.

BRIEF DESCRIPTION OF THE DRAWINGS

Further advantages and properties of the invention will be explained below with reference to an exemplary embodiment illustrated in the Figures, in which.

DESCRIPTION OF THE PREFERRED EMBODIMENTS

Figure 1:
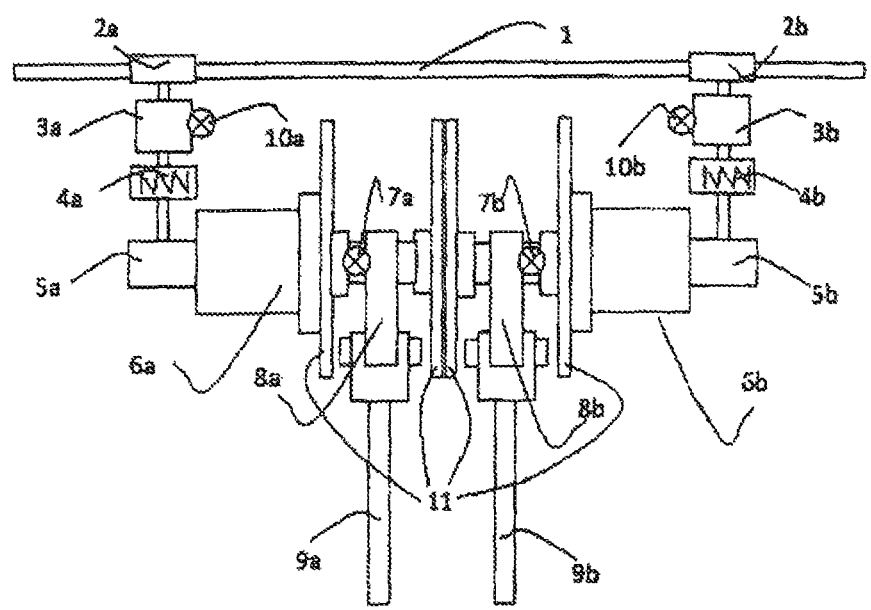
FIG. 1 shows a schematic representation of the aircraft high lift system according to the invention.

FIG. 1 outlines the structure of the aircraft high lift system according to the invention. The Figure shows the rotary shaft 1 of the landing flap drive system, which transports the necessary actuating energy from a central drive unit to the respective drive stations. The Figure shows exactly one drive station with two redundant load paths with one actuator each, which both operate independent of each other and are operated in parallel in the active mode.

Each load path comprises a branch transmission 2a, 2b by means of which the energy of the rotary shaft system 1 is withdrawn and supplied to a separate mechanical overload fuse 3a, 3b. The mechanical overload fuses 3a, 3b are designed in the form of a known torque limiter (or torque brake), which in normal operation forward the supplied actuating energy to the succeeding synchronization units 4a, 4b. When the applied torque in the respective load path exceeds a certain limit value, the respective overload fuse 3a, 3b interrupts its load path. Then, no more load component can be transmitted via the separate load path. The remaining intact load path completely takes over the total load for the flap actuating movement. Responding of the overload fuse 3a, 3b is detected by the respective state sensors 10a, 10b and communicated to a central control unit. The state sensors 10a, 10b are designed in the form of simple switches or proximity switches.

Alternatively, instead of the mechanical overload fuses 3a, 3b with the state sensors 10a, 10b, there might also be used load sensors in conjunction with an electronic evaluation unit which in a case of overload detects a fault with reference to the measured torque and takes corresponding countermeasures.

The setting of the response values of the overload fuses for example is 65% of the maximum total operating load. When the load imbalance becomes too large due to a fault, the load component of the load path subjected to a higher load will increase and the fuse will pop out. Depending on the instantaneous value of the operating load upon occurrence of the fault, one or also both overload fuses can respond.

In fault-free operation, the station load automatically is distributed on the two load paths at 50% each. The load equilibrium, however, is impaired differently by different drag torques, clearances, efficiencies and adjustment errors ("rigging") within the two load paths. The resulting imbalance between the load paths can be more than +/−25% of the maximum value of the station load. For this reason, the synchronization units 4a, 4b succeeding in the drive train are used, which contribute to the compensation of the different clearances, drag torques, efficiencies or adjustment errors in the respective load paths. The synchronization units 4a, 4b consist of a torsion spring whose spring rate is designed such that in fault-free operation the asymmetry of the load distribution does not exceed a range of +/−25% of the maximum value of the operating load. The concrete construction of the units 4a, 4b for example can comprise a torsion bar or a ball ramp mechanism biased with springs.

The torque is passed on from the synchronization units 4a, 4b to the succeeding transmission units 5a, 5b, which are necessary for compensating directional and positional differences of the connection between branch transmission 2a, 2b and rotational transmission 6a, 6b.

The rotational transmissions 6a, 6b transform the input shaft power of the rotary shaft system 1 from low torque and high speed into the required output shaft power from high torque at low speed. The transmission 6a, 6b is attached to the structure 11 of the aircraft. The output shaft of the rotational transmission 6a, 6b is connected with the lever mechanism 8a, 8b. The torque sensors 7a, 7b continuously measure the shaft torque of the output shaft of the rotational transmission 6a, 6b and forward the detected measurement values to the central control unit.

The lever mechanism 8a, 8b transforms the rotational movement of the drive shaft of the rotational transmission 6a, 6b into a translational movement for the actuating movement of the landing flap. The actuating movement is transmitted to the landing flap or its guide mechanism by means of the push rods 9a, 9b.

The state sensors 10a, 10b of the overload means generate a discrete signal which in normal operation of the system corresponds to an "On" or "High". An activation, i.e. responding of the overload fuse 3a, 3b, changes the signal into "Off" or "Low". With this signal logic it is achieved that a sensor error does not remain undiscovered, i.e. remains undetected in the form of a dormant fault and will only be noticed in the case of certain actions.

The non-illustrated electronic evaluation unit serves for monitoring the drive station, the detection of mechanical faults and their indication. It processes the signals of the load sensors 7a, 7b and of the state sensors 10a, 10b by the following method according to the invention.

The monitor system consists of three sequentially proceeding monitor cycles. Each monitor run results in a fault status signal of the form 0 (no fault) or 1 (fault). The individual fault status signals then can be combined to a common binary code and be issued. Each binary codes symbolizes an individual fault image.

During the initialization phase, i.e. after switching on the system, a so-called "pre-flight check" is carried out once. It thereby is ensured that the individual sensor signals themselves are not faulty and the sensors 7a, 7b, 10a, 10b operate properly. After initially switching on the monitoring system, the control unit therefore reads in the instantaneous values of the load sensors 7a, 7b. When the instantaneous values lie within defined limit values, a fault-free sensor operation is assumed. When the instantaneous values exceed defined limit values, the presence of a sensor fault is inferred and a fault message is generated and displayed. Subsequently, the control unit reads in the signals of the state sensors 10a, 10b of the overload fuses 3a, 3b and evaluates their discrete signal values. In a case of fault, the state sensors issue a signal value of "Zero" or "Low" and the control unit detects and generates an appropriate fault message. In fault-free operation, i.e. both sensors 10*a*, 10*b* generate output values with the value "Unity" or "High", a fault-free operation of the monitoring system is assumed and the first monitoring algorithm for the regular flight operation is started.

This first monitor serves for detecting the load distribution and is repeated continuously during the entire flight. The result of the monitor run is documented correspondingly in the control unit and stored temporarily for future retrieval.

The control unit continuously reads in the instantaneous values of the load sensors and based thereon calculates the differential amount from the signal values or load values. As long as the differential amount is smaller than a predefined threshold value which defines the limits of the so-called "blind zone" (the value lies within the blind zone), a fault-free operation is assumed and documented correspondingly. In this case, the succeeding monitor is started for detecting jammings, which will yet be explained at a later stage of this description.

"Blind zone" is understood to be the load range below the guaranteed minimum load ("minimum daily load"). In this zone, no robust monitoring is possible, the results of the individual monitors are not exploited. The limits of the "blind zone" are calculated by the control unit from the instantaneous values of the torque sensors 7*a*, 7*b*.

When the calculated differential amount of the sensor values, however, is greater than the predefined threshold value, the air load is greater than the guaranteed minimum load. The control unit then calculates the sum of the instantaneous values of the torque sensors 7*a*, 7*b* and therefrom deducts the double voltage value of the sensor output at the load 0. When this value lies within the threshold values which define the limits between fault-free operation and faulty operation, a fault-free operation is assumed and correspondingly stored temporarily. Here as well, the execution of the succeeding monitor follows for detecting flap jamming.

When the value lies outside these threshold values, a fault of the system is detected. The control unit then generates an appropriate fault message and stores the same for the subsequent retrieval. The succeeding monitor for detecting flap jammings will be started.

This monitor for detecting the flap mechanism or a state of jamming is repeated continuously during the flight operation. The monitor result is documented and stored temporarily in the control unit.

During the monitor cycle, the control unit reads out the instantaneous values of the state sensors 10*a* of the overload fuse 3*a* and evaluates the discrete signals obtained. When the signal of the sensors 10*a* is an "On" or "High", a fault-free signal is generated and stored temporarily. When the signal of the sensors 10*a* provides a "Zero" or "Low", a fault signal is generated and stored temporarily.

The same procedure is carried out for the second sensor 10*b*. After the complete query cycle of the above-described monitors, the evaluation cycle or evaluation monitor finally is started.

During the evaluation cycle, the control unit generates a corresponding fault code from the temporarily stored fault status signal of the first and second monitor for the future representation and evaluation. With reference to the generated fault code the determined type of fault can be inferred exactly. The type of fault is forwarded to a next higher system hierarchy.

When a fault-free state exists, the next monitor run is started, starting with the first monitor.

With reference to the measurement values of the load sensors 7*a*, 7*b*, the monitor system thus can detect an asymmetric distribution of the load on the individual load paths and generate a corresponding fault message. In the fault case of jamming in one of the load paths the corresponding mechanical overload fuse 3*a*, 3*b* is tripped, which is detected by the associated state sensor 10*a*, 10*b* and communicated to the controller. The fault message generated thereupon thus identifies jamming within one of the load paths.

In the fault case of jamming of the flap body, the load symmetry is maintained. In this case, both overload fuses 3*a*, 3*b* would respond and generate a corresponding fault image. However, when a fault image is generated which on the one hand describes an asymmetric distribution of the load on the load paths and at the same time issues fault cases for both overload fuses, an invalid state is detected and an unknown malfunction of the monitoring system is assumed. The monitoring system then is switched off with a corresponding fault message.

Figure 2A:
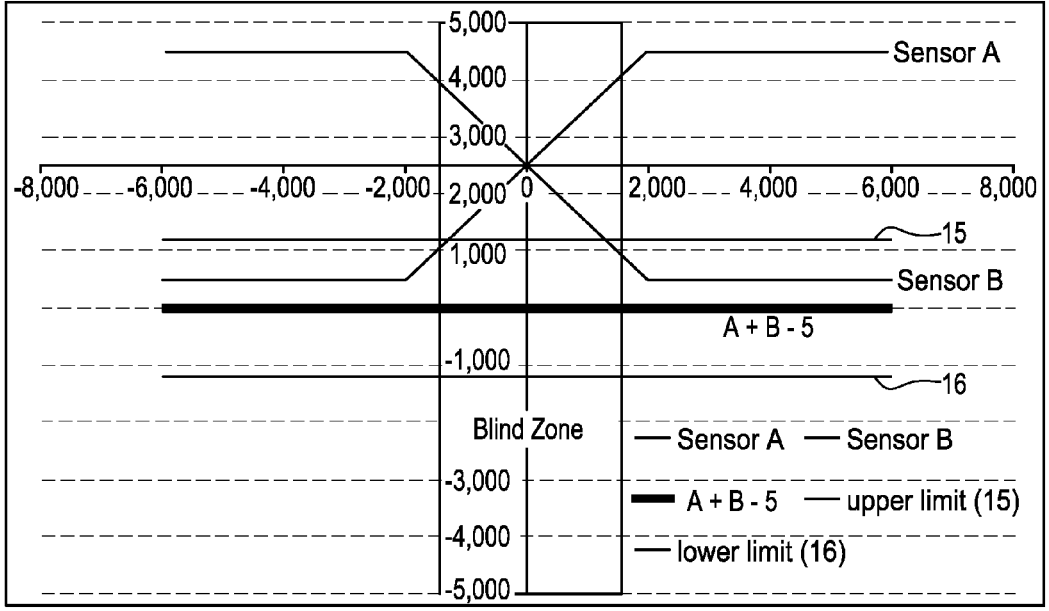
FIGS. 2A and 2B show a representation of the load sensor signals in the fault-free case.
Figure 2B:
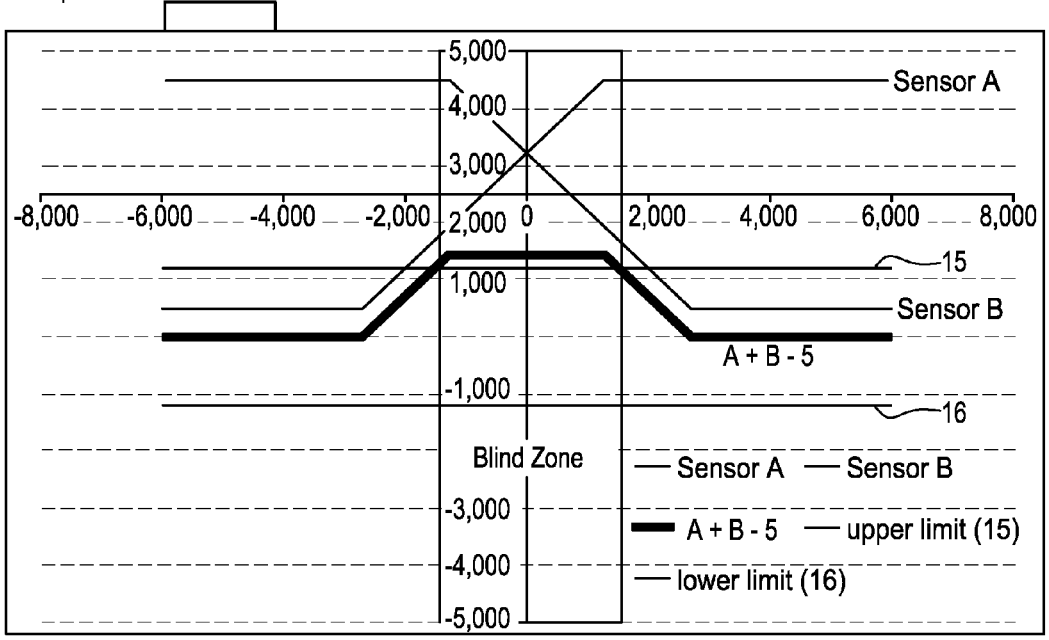

FIGS. 2*a*, 2*b* show the signal course of the torque sensors 7*a*, 7*b* in the fault-free state. Due to different clearances, frictions, efficiencies and adjustment errors a certain torque deviation between the load paths can occur in the individual load paths, i.e. the measured load values differ from the actual air loads. For the correct evaluation of the signals of the load sensors 7*a*, 7*b* this torque offset value should, however, not influence the correct fault detection. The used threshold values 15, 16 therefore must consider the influence of these effects, in order to ensure a robust fault monitoring. The hatched area designates the "blind zone" explained above.

FIG. 2*a* shows an operation without influencing signal values, while in FIG. 2*b* a unilateral maximum influencing of signal values is present in the range of 700 Nm. This leads to a deviation of the calculated value $$A+B-n,$$

wherein A represents the load value of the sensor 7*a* and B represents the load value of the sensor 7*b*, and n corresponds to twice the voltage value of the sensor output at the load 0.

Figure 3A:
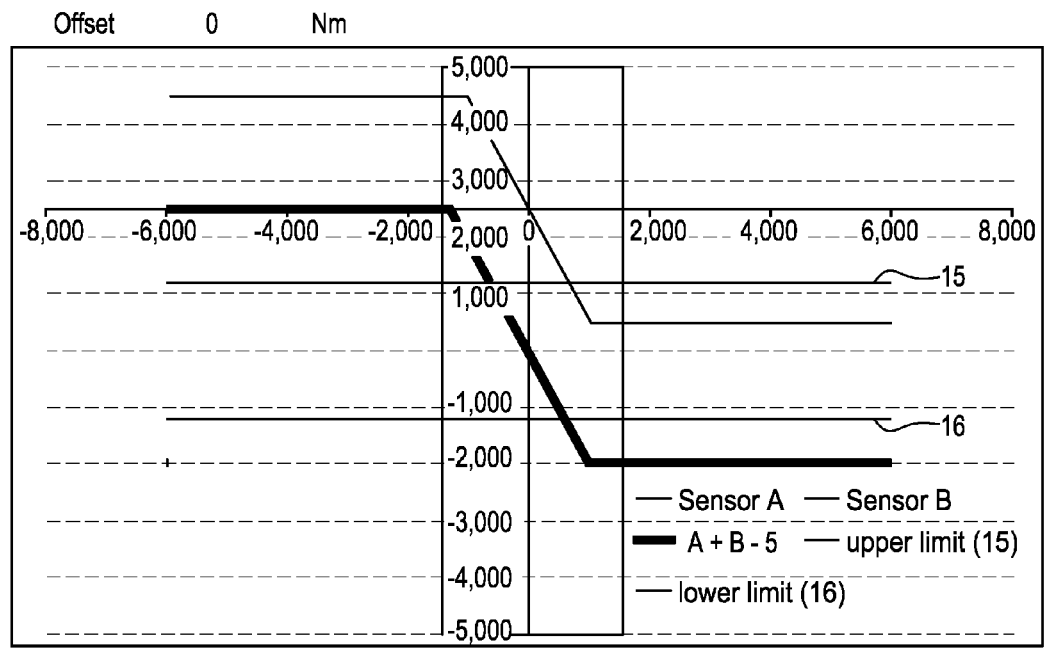
FIGS. 3A and 3B show a representation of the load sensor signals in the case of fault.
Figure 3B:
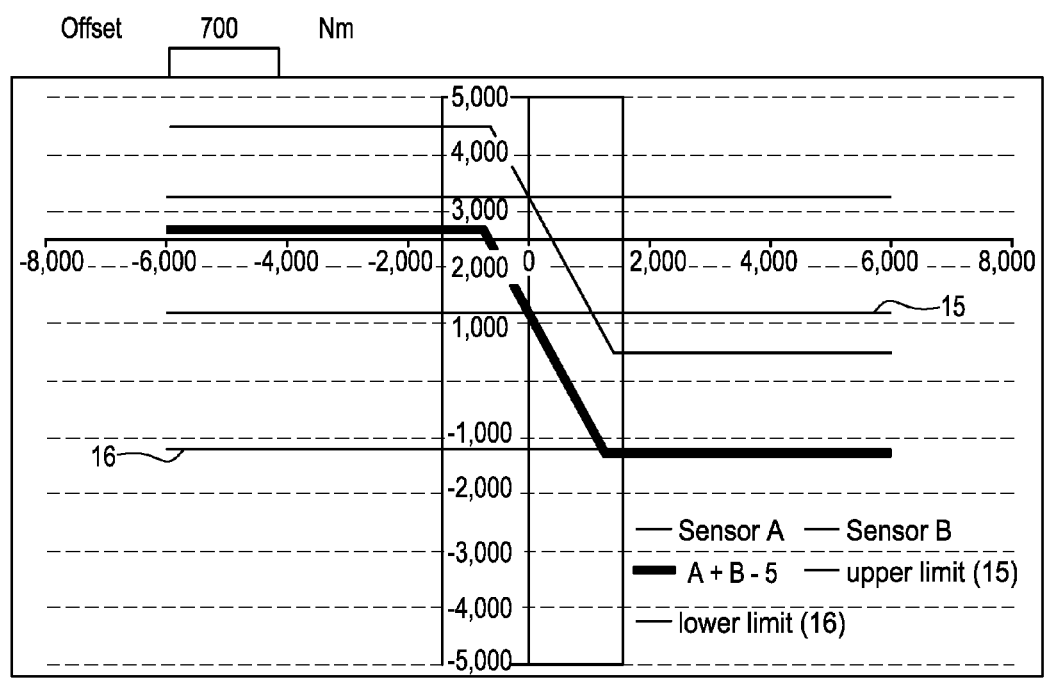

The two FIGS. 3*a*, 3*b* show the signal course of the sensor values of the load sensors 7*a*, 7*b* after an interruption of the load path a. The measured load moment of the sensor 7*a* hence is 0. Analogous to FIG. 2*b*, FIG. 3*b* shows a unilateral maximum influencing of signal values in the range of 700 Nm.

On the actuator level it should be stated as an advantage that the method according to the invention provides for reduced maintenance costs by using rotational drives. In addition a passive, automatic load synchronization is effected, which due to the largest possible mechanical decoupling between both load paths also is free of repercussions. There is no power transfer between the two load paths.

Using a differential transmission instead of the two synchronization units 4*a*, 4*b* would have the disadvantage that this would produce an inadmissible coupling point between the two load paths, which in the case of a breakage would lead to the complete failure of the system. The same also applies for the use of a beam balance, which likewise would produce a non-acceptable coupling point between the two load paths.

Furthermore, the invention offers a possibility for the uninterrupted monitoring of the entire load path. Dormant faults can be excluded, and the monitoring system can localize and identify the fault.

The illustrated exemplary embodiment of the flap system also is usable for the realization of the thrust reversal of an aircraft engine without expensive technical modification.

The invention claimed is:

1. A method for monitoring an aircraft high lift system or an engine actuator having a rotary shaft and a first and a second load path from the rotary shaft, the method comprising the steps of:
arranging at least a first and a second redundant load path from a rotational shaft, the first and second load paths comprising a first and a second respective rotational transmission having a first and a second respective output shaft;
positioning a first and a second respective torque sensor (7a, 7b) on the first and second output shafts, reading the output torque values of the first and second output shafts from the first and second torque sensors of the first and second transmissions according to a predefined cycle, and determining the difference in torque output from the first and second rotational transmissions;
providing a predefined torque threshold value or range and according to the predefined cycle, determining whether the difference, if any, between the output-side torque values at the first and second rotational transmissions of the at least two load paths exceeds the predefined torque threshold value and/or lies within the defined range; and
generating a signal representing whether the cyclically measured difference in the torque value output from the first and the second rotational transmissions exceeds the threshold or range, and transmitting the signal to a control unit.

2. The method according to claim 1, comprising the steps of
providing a torque offset value and taking this offset value into consideration when calculating whether the cyclically measured difference in the torque value output from the first and the second rotational transmissions exceeds the threshold or range.

3. The method according to claim 1, comprising providing a first and a second respective torque overload fuse having a predetermined torque value on the rotary shaft drive side of the respective first and second rotational transmissions, which provide a fault interrupt when the torque exceeds the predefined value and first and second respective overload fuse state sensors for monitoring the state of the first and second overload fuses, generating a signal representing the state of the overload fuses and querying, cyclically, a drive-side state of the first and second rotational transmissions (5a, 5b) by checking the state of the first and second overload fuses (3a, 3b), positioned in each said load path, as determined by the first and second overload fuse sensors.

4. The method according to claim 3, comprising the step of creating a binary fault image signal representing whether the torque sensors and overload fuse sensors detected the load exceeding the predefined values based on an output-side/drive-side check of the load paths and transmitting the signal to the control unit.

5. The method according to claim 1, comprising the step of carrying out once, an initial output-side/drive-side check of the load paths.

6. The method according to claim 2, wherein the offset value corresponds to twice a voltage value of a sensor output at a load of zero.

7. The method according to claim 4, comprising the additional step of
providing a higher control hierarchy for further control logic in the control unit and generating a signal corresponding the fault image and forwarding the signal corresponding to the fault image to the higher control hierarchy for further control logic in the control unit.

8. The method according to claim 7, wherein the fault image is a binary fault code.

9. The method according to claim 1, wherein the load paths (2a, 3a, 4a, 5a, 6a, 8a, 9a; 2b, 3b, 4b, 5b, 6b, 8b, 9b) are arranged independently from one another or uncoupled from one another.

* * * * *